(12) United States Patent
Kubicki et al.

(10) Patent No.: US 9,117,239 B2
(45) Date of Patent: Aug. 25, 2015

(54) METHOD AND SYSTEM FOR GENERATING A DATA GRID INTERFACE TO MONITOR AND RECOMMEND RELEVANT PRODUCTS

(71) Applicant: RENO ACQUISITIONS, LLC, Saratoga Springs, NY (US)

(72) Inventors: Kristopher Kubicki, Chicago, IL (US); Lawrence Hsieh, Vancouver (CA)

(*) Notice: Subject to any disclaimer, the term of this patent is extended or adjusted under 35 U.S.C. 154(b) by 0 days.

(21) Appl. No.: 13/841,345

(22) Filed: Mar. 15, 2013

(65) Prior Publication Data
US 2014/0279195 A1 Sep. 18, 2014

Related U.S. Application Data

(63) Continuation-in-part of application No. 13/802,102, filed on Mar. 13, 2013.

(51) Int. Cl.
*G06Q 30/00* (2012.01)
*G06Q 30/06* (2012.01)
*G06F 3/048* (2013.01)
*G06F 17/30* (2006.01)

(52) U.S. Cl.
CPC ............ *G06Q 30/0641* (2013.01); *G06F 3/048* (2013.01); *G06F 17/3089* (2013.01); *G06Q 30/0631* (2013.01)

(58) Field of Classification Search
CPC ............ G06Q 30/0631–30/0643; G06F 3/048; G06F 5/00; G06F 7/00; G06F 17/30
See application file for complete search history.

(56) References Cited

U.S. PATENT DOCUMENTS

| | | | |
|---|---|---|---|
| 7,107,226 B1 * | 9/2006 | Cassidy et al. | 705/26.8 |
| 7,136,863 B2 | 11/2006 | Wang | |
| 8,255,291 B1 * | 8/2012 | Nair | 705/26.64 |
| 2008/0249887 A1 * | 10/2008 | Cao | 705/26 |
| 2010/0250336 A1 | 9/2010 | Selinger et al. | |
| 2012/0188246 A1 * | 7/2012 | Cheung et al. | 345/428 |
| 2013/0198022 A1 | 8/2013 | Zhang | |

OTHER PUBLICATIONS

U.S. Appl. No. 13/802,102 by Kubicki, K., et al., filed Mar. 13, 2013.
Non-Final Office Action mailed Jul. 31, 2014, for U.S. Appl. No. 13/802,102, of Kubicki et al. filed Mar. 13, 2014.
Restriction Requirement mailed Apr. 2, 2014, for U.S. Appl. No. 13/802,102, of Kubicki et al. filed Mar. 13, 2014.

* cited by examiner

*Primary Examiner* — William Allen
*Assistant Examiner* — Anand Loharikar
(74) *Attorney, Agent, or Firm* — Perkins Coie LLP (57) ABSTRACT

Techniques for a product search grid are disclosed herein. The method for presenting a grid includes receiving data in association with a plurality of products from one or more merchant websites; presenting a data grid including cells based on the data, wherein each cell of the cells represents a product of the products or a replacement of a product of the products; displaying information regarding the products or the replacements of the products in the cells; and updating the contents of cells of the data grid automatically in real time in response to new data received from the merchant websites.

20 Claims, 9 Drawing Sheets

| Userid | Key_id | Counter |
|--------|--------|---------|
| V00001494 | Size | 12 |
| V00001494 | Color | 5 |
| V00001494 | Brand | -6 |

METHOD AND SYSTEM FOR GENERATING A DATA GRID INTERFACE TO MONITOR AND RECOMMEND RELEVANT PRODUCTS

This application is a continuation-in-part of U.S. non-Provisional application Ser. No. 13/802,102, filed on Mar. 13, 2013, the content of which is incorporated herein by reference in its entirety.

FIELD OF THE INVENTION

At least one embodiment of the present invention pertains to tracking ecommerce data, and more particularly, to monitoring and recommending relevant products based on ecommerce data.

BACKGROUND

The rapid growth in computer, the Internet, and telecommunication technology has brought about a change in how product manufacturers sell their goods. While brick and mortar establishments still provide an outlet for goods, running an ecommerce website is relatively inexpensive compared to a brick and mortar establishment and this has led to a large number of online retailers. In order to remain competitive, it can be important for online retailers to monitor competitor's prices and offerings. Manufacturers also have an interest in monitoring the pricing and availability of their products that are sold through online retailers.

There are times when a person, a vendor, or a manufacturer wants to create a list of products being sold at a list of retailers. In this scenario, the goal is to identify closely related products being sold at different merchants. These closely related products can be either identical, or similar in nature. The information regarding the closely related products is useful for various applications, including competitive pricing, enforcing minimum price monitoring (MAP) violation, commerce analytics, and marketing.

Unfortunately, the process of identifying closely related products is typically a manual and cumbersome task. The task is often dependent on the subjective judgment of a user conducting the task. Different persons may disagree on criterion of how to define a set of closely related products. Whether multiple products are similar to each other can be confirmed or denied based on different criteria. Furthermore, the user conducting the task may not fully understand the criteria to make an appropriate judgment on the criteria.

SUMMARY

The technology introduced here provides a system to automatically adjusting criteria of determining product closeness based on a trained set of data. The system continues to update as the user gives more feedback information to the system, or if the market changes.

In accordance with the techniques introduced here, therefore, a method for recommending similar products is provided. The method includes receiving a positive input from a user, the positive input indicating that the user accepts that a first product is similar to a second product; determining, by a database, one or more specification keys of the first product that a database record of the second product contain; for each of the specification keys, increasing a weight counter for the specification key in response to the positive input; calculating a closeness score between the first and second products based on values of the specification keys of the first product, values of the specification keys of the second product, and weight counters for the specification keys; and recommending the first product as a replacement of the second product based on the closeness score.

In accordance with the techniques introduced here, another method for recommending similar products is provided. The method includes receiving a negative input from a user, the negative input indicating that the user rejects that a first product is similar to a second product; determining, by a database, one or more specification keys of the first product that a database record of the second product contain; for each of the specification keys, decreasing a weight counter for the specification key in response to the positive input; calculating a closeness score between the first and second products based on values of the specification keys of the first product, values of the specification keys of the second product, and weight counters for the specification keys; and recommending the first product as a replacement of the second product based on the closeness score.

In accordance with the techniques introduced here, yet another method for recommending similar products is provided. The method includes transmitting, to a client terminal or a display device, prices of a plurality of products being sold at a plurality of online merchants; if a second product of the plurality of products is not being sold at an individual online merchant of the plurality of online merchants, transmitting a price of a first product being sold at the individual online merchant as a replacement of the second product; receiving a positive input from a user, the positive input indicating that the user accepts that a first product is similar to a second product; updating a plurality of closeness scores based on the positive input, wherein each of the closeness scores corresponds to two products and indicates how similar these two products are for the user; and determining whether to keep the price of the first product based on the closeness scores.

In accordance with the techniques introduced here, a computer system for recommending similar products is provided. The computer system includes a processor, a network interface and a memory. The network interface is coupled to the processor through which the computer system can retrieve specification information of products from merchant web servers. The memory stores instructions which, when executed by the processor, cause the computer system to perform a process. The process includes receiving a positive input from a user, the positive input indicating that the user accepts that a first product is similar to a second product; determining, by a database, one or more specification keys of the first product that a database record of the second product contain; for each of the specification keys, increasing a weight counter for the specification key in response to the positive input; calculating a closeness score between the first and second products based on values of the specification keys of the first product, values of the specification keys of the second product, and weight counters for the specification keys; and recommending the first product as a replacement of the second product based on the closeness score.

The system helps people pick products that are similar in nature to each other. The system further provides an easy-to-use interface that shows the user's products and exactly matched products at competing retailers. The system populates the empty cells that have no exactly matched products with recommended similar products. Recommendations are based on attributes such as price, color, weight, or other attributes. The user of the system has the option to accept or reject those recommended matches. If the user accepts a recommended match, the system strengthens the weight of the common attributes of the products for other recommendations. With the information regarding the user accepting and rejecting the recommended matches, the system can adjust the attribute weighting across the user's full product set. Thus, the system learns the preference of the user without too many input work from the user. The system does the learning by parsing key value pairs and data types that are found in unstructured data from the product web pages.

The information regarding the closely related products is useful for various applications. In one embodiment, a merchant can use the system to monitor prices of competitors' products that are similar to its house brand products. In another embodiment, a merchant can line up comparable products from competitor manufacturers using the system, to help picking the exact part from products having different brand names. This is particularly effective for drop-in replacement commodity products, such as computer memory.

Other aspects of the technology introduced here will be apparent from the accompanying figures and from the detailed description, which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this description to "an embodiment", "one embodiment", or the like, mean that the particular feature, function, or characteristic being described is included in at least one embodiment of the present invention. Occurrences of such phrases in this description do not necessarily all refer to the same embodiment, nor are they necessarily mutually exclusive.

Figure 1:
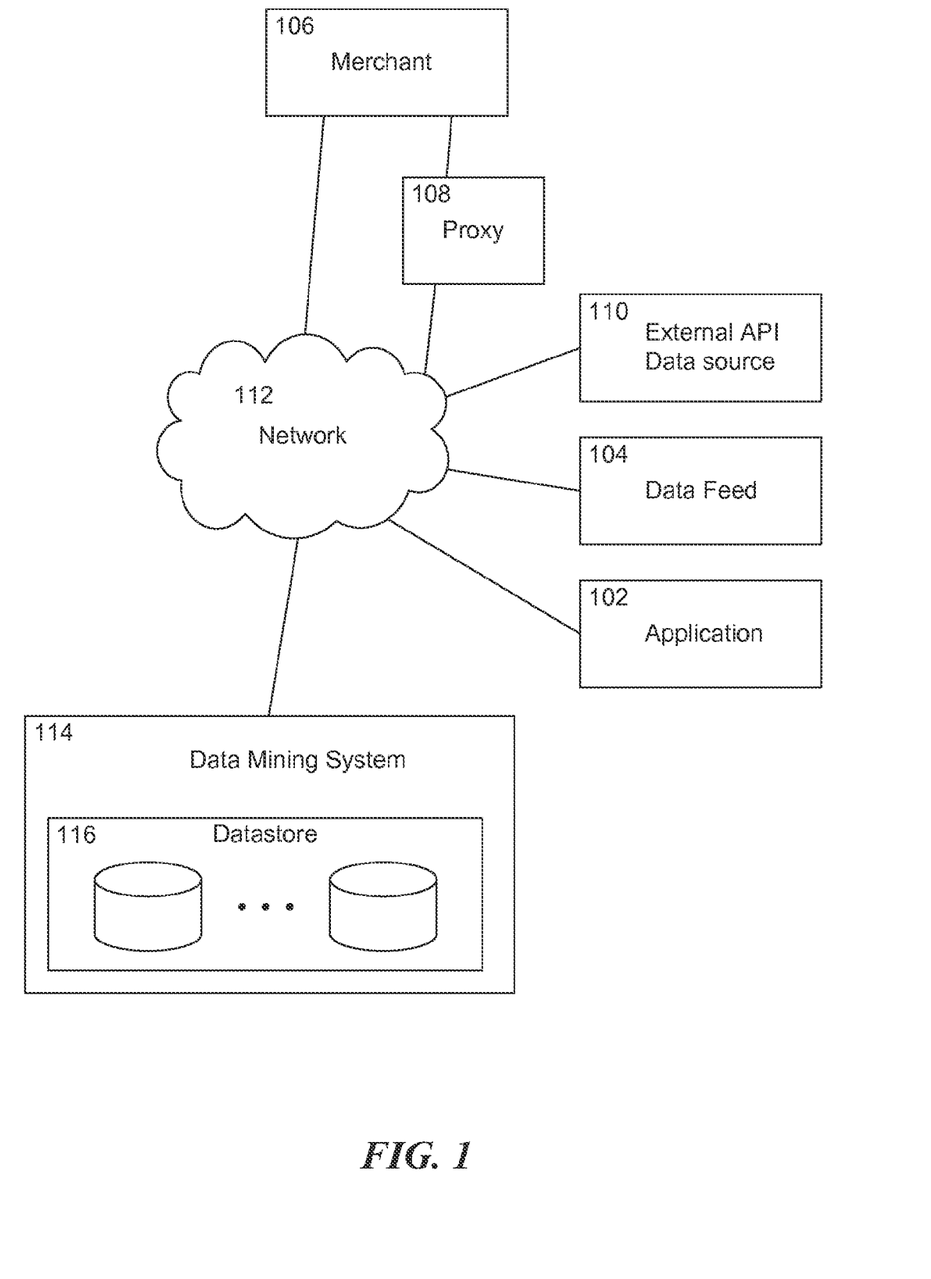
FIG. 1 illustrates an example of an ecommerce environment according to the techniques introduced here.

FIG. 1 shows an example of an ecommerce environment according to the techniques introduced here. The environment includes an application 102, a data feed 104, a merchant site 106, an external data source 110, a data mining system 114, and a proxy server 108 (optional), all connected through a network 112. The network can be a packet-switched network, for example, a local area network (LAN) or a wide area network (WAN). Additionally, the network 112 can be a combination of one or more networks, for example, the Internet. The data mining system 114 includes a datastore 116. Alternatively, datastore 116 can be separate from the data mining system 114 and can be accessed by the data mining system 114 through network 112 or some other interconnect.

An example of the data mining system in operation begins with an application 102 requesting data from the data mining system 114 through the network 112. In one embodiment, the request can be for price data relating to a particular product. The data mining system 114 receives the request and initiates a search to gather information relating to the request. Several sources are available from which the data mining system 114 can gather data. One source is a dedicated data feed 104, for example, a CSV (comma-separated values) feed, an RSS (Really Simple Syndication) feed, etc., that is provided by merchants, data aggregators, or other sources. The data mining system 114 can connect to a data feed 104 and download information related to the product requested by the application 102.

Another source of data for the data mining system 114 is an external data source 110. Large merchants, shopping sites, and data aggregators, often expose an application programming interface (API) that allows an outside entity to access selected information contained in the merchant's databases. For example, the data mining system 114 can include an engine which accesses a merchant database through an exposed API 110 and gathers information related to the product requested by the application 102.

Yet another source of information which the data mining system 114 can use to obtain product information for application 102 is the buy page of a merchant site 106 that displays a particular product. The buy pages are online web pages where customers can purchase the products. The data mining system 114 can connect to the merchant site 106 through the network 112. The data mining system 114 can then parse the information contained on the merchant's product page to gather information relevant to the application's request. In one embodiment, the data mining system 114 connects to the merchant site 106 through a proxy server 108.

Figure 2:
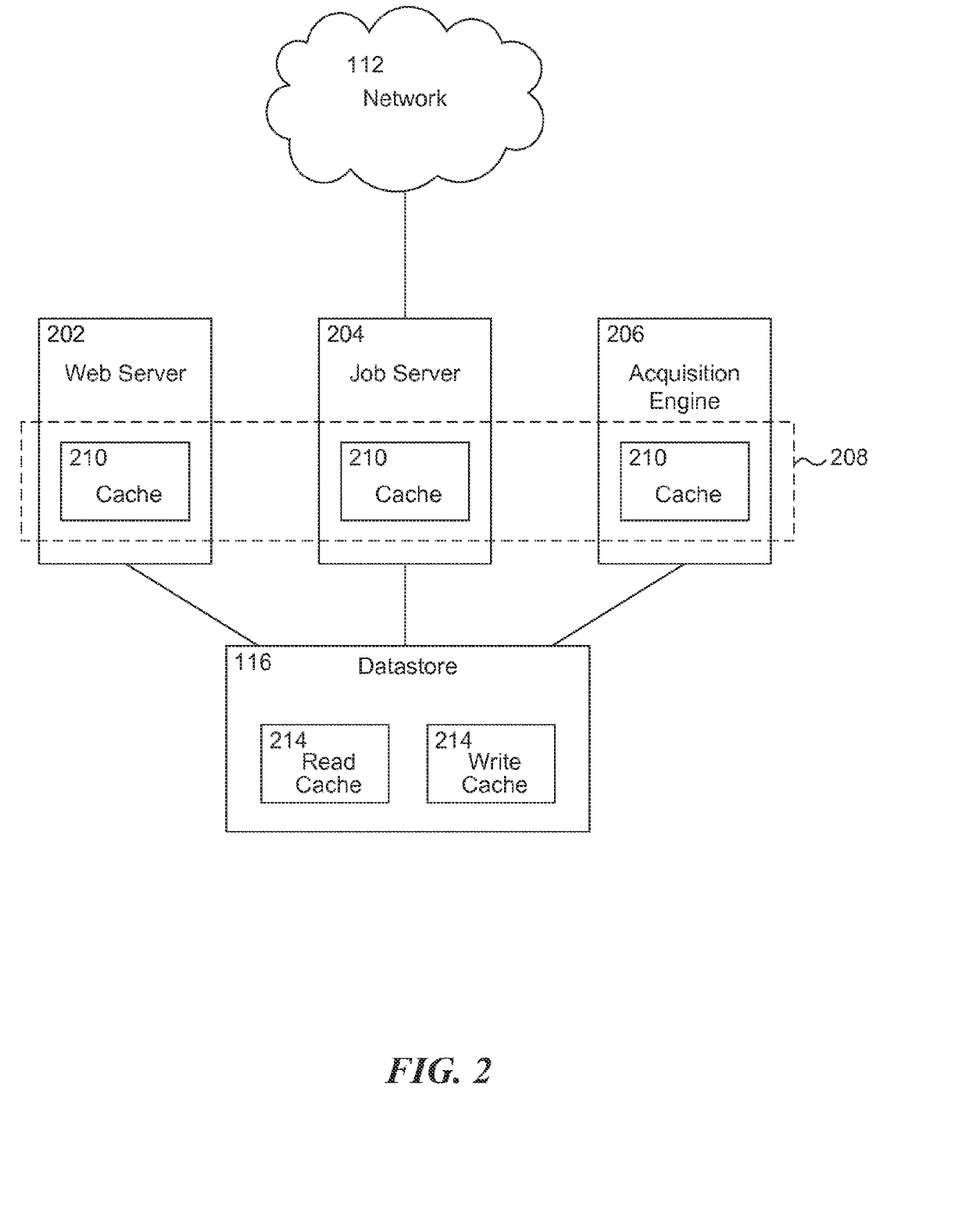
FIG. 2 illustrates an example of a data mining system according to the techniques introduced here.

FIG. 2 shows an example of a data mining system 114 according to the techniques introduced here. The data mining system 114 is connected to network 112 as depicted in FIG. 1. The data mining system includes a web server 202, a job server 204, an acquisition engine 206, shared memory 208, and datastore 116. The elements of the data mining system 114 are shown connected through network 112, however, it should be apparent that the elements can be connected through other interconnects as well. Further, while only a single web server 202, job server 204, acquisition engine 206, and datastore 116 are shown in FIG. 2, it should be understood that there can be multiples of each element operating in the data mining system 114 concurrently.

An application 102 connects to the data mining system 114 through the web server 202 to request information. In one embodiment, the web server 202 provides access to a web-based dashboard that acts as an interface between an end user and the data mining system. In another embodiment, the web server 202 exposes an API which external entities can utilize to access the data mining system 114 or data maintained by the data mining system. Regardless of how the data mining system is accessed, when a request for information is received a job request is forwarded from the web server 202 to the job server 204.

Job server 204 maintains a queue of job requests received from web server 202. Acquisition engine 206 monitors the job queue maintained by job server 204. In one embodiment, acquisition engine 206 is a self-replicating engine which maintains a suitable number of instantiations to process the job requests within the job queue. In one embodiment acquisition engine 206 stores results from performing a job in the datastore 116. In another embodiment, the results are also stored in a local copy 210 of shared memory 208. The data in the local copy can then be replicated to other local copies in the shared memory so the data is available to all elements of the data mining system.

Datastore 116 includes a write cache 212 and a read cache 214. Because there can be multiple acquisition engines working concurrently, there is potentially a high volume of writes to a database included in datastore 116 that can happen concurrently. This may cause a bottleneck and slow down the data acquisition process. In order to prevent this bottleneck, write cache 212 stores the data as the data is returned by the acquisition engines and then the data is written to the database from the cache 212. The read cache 214 works in a similar manner except that the data is stored in a cache so there is not a bottleneck created by a large number of reads to the database.

Figure 3:
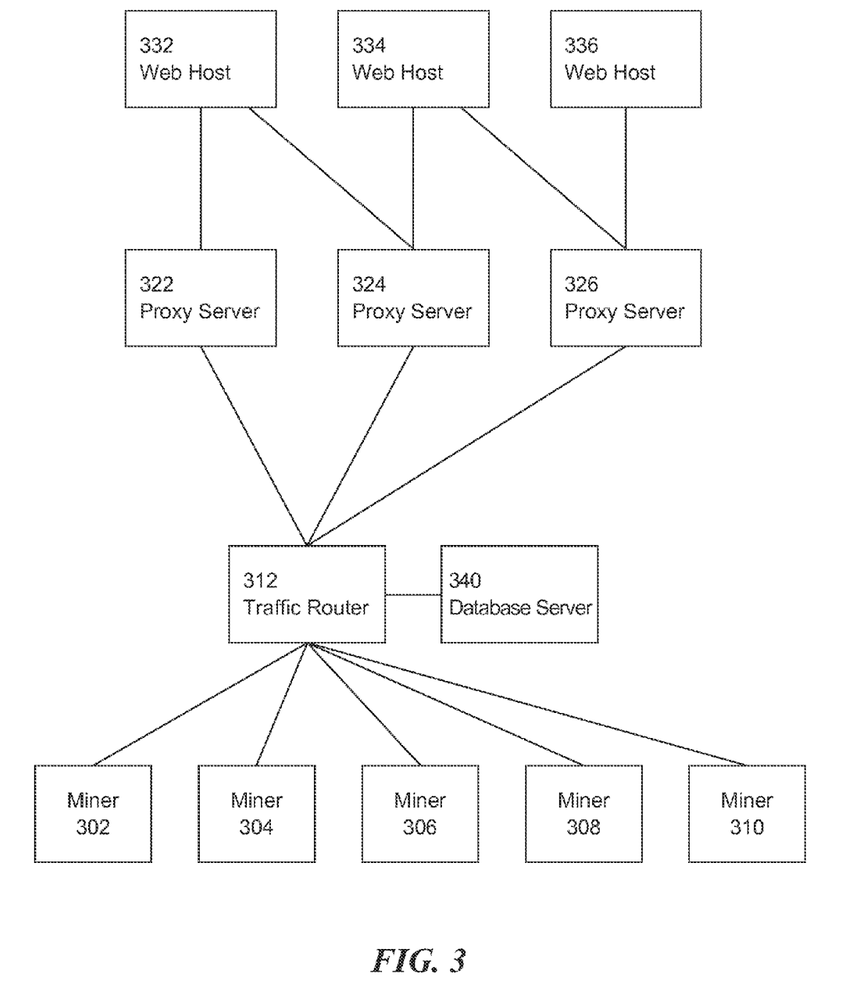
FIG. 3 illustrates an example of an online merchandise monitor system for extracting and monitoring online product information from online merchants.

FIG. 3 illustrates an example of an online merchandise monitor system (also referred as monitor system or system in the disclosure) for extracting and monitoring online product information from online merchants. A system according to one embodiment of the disclosure utilizes at least one traffic router (312), to leverage centralized, global connections from requesters such as a plurality of miners 302, 304, 306, 308, and 310) with concurrent requests. For example, the number of miners may be several thousands. In one embodiment, each miner may be a computer or a process running on a computer. Each miner sends one or more requests, such as an HTTP request, for fetching network objects from one or more target web hosts 332, 334, and 336) through the Internet. A network address, such as a URL, is included in the request. A web host may be any HTTP web server, such as an HTTP web server for a manufacturer or a vendor. A network object may comprises a text, a web page, an image, an HTML file, a CSS file, a JavaScript file, an audio, a video, or content-less HTTP control messages.

The traffic router 312 receives the requests from the miners (302, 304, 306, 308, 310), and selects a proxy server for processing the request among a plurality of available proxy servers (322, 324, 326). If there is a current connection between an available proxy server and the target web host, the traffic router selects this proxy server having the current connection for the request. In this case, the traffic router utilizes an existing connection (route) to the target web host for fetching the network object without the need of initiating a new connection. If there is no current connection between the target web host and any available proxy server, the traffic selects a proxy server to initiate a new connection between the proxy server and the target web host.

In one embodiment, the selection of proxy server for the new connection is based on two principles. First, the route history between the target web host and each proxy server is considered. For a web host and a proxy server, the route history is defined as a number of expired connections between the web host and the proxy server. The route histories between different web hosts and different proxy servers are tracked and recorded in a route history database. The proxy server has the least route history with the target host is preferred for initiating the new connection. Thus, the chance of one or more particular proxy servers frequently connecting to the same target host is minimized. The target host will receive connections from different proxy servers so that no particular proxy server is suspected or blocked.

Second, the current load of each proxy server is also considered. For each proxy server, the current load is defined as a total number of the proxy server's current connections with all web hosts. The current load of each proxy server is tracked and recorded in a current load database. The proxy server having the least current load, i.e. the proxy server having the smallest number of current connections, is preferred for initiating new connection. Therefore, the burden of the proxy servers tends to be spread evenly; and chance of overusing any particular proxy server is minimized.

Each proxy server may be different in terms of authentication mode and communication protocol. For example, each proxy server may have different authentication mode and/or different username, password or other credentials. Furthermore, a proxy server may require receiving requests in different protocols, such as VPN, SOCKS, SRCIP, L2TP or HTTP. The network object requests received by the traffic router are usually requests using the HTTP protocol.

Figure 4:
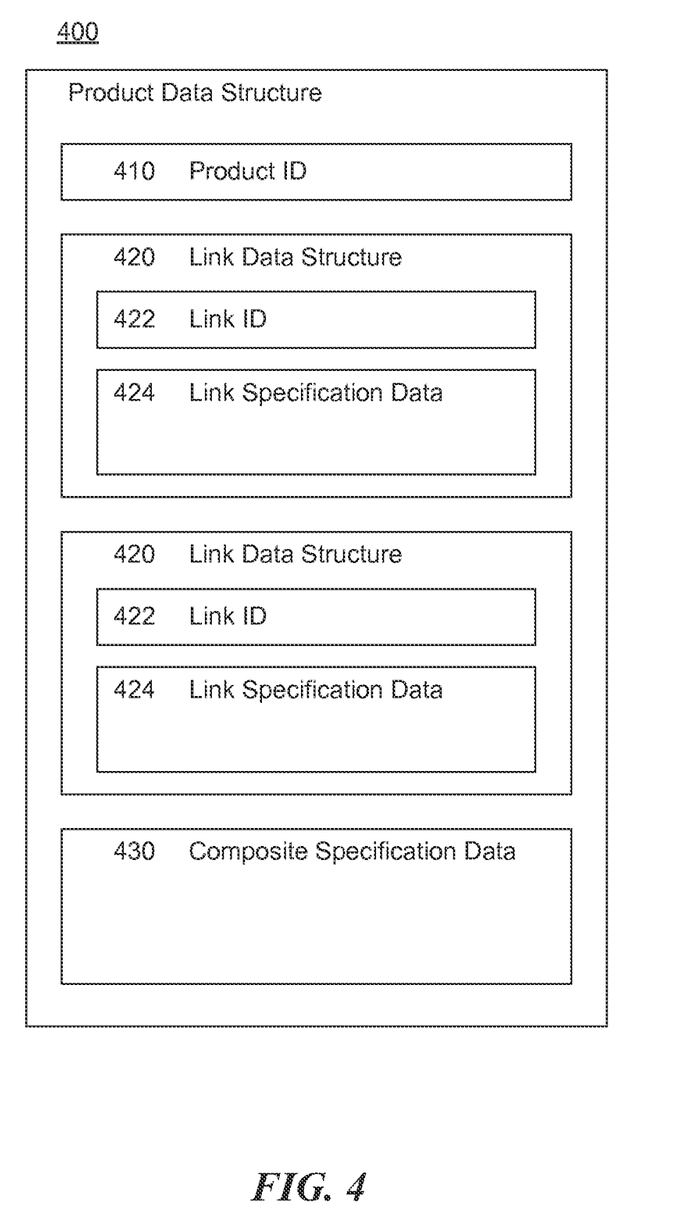
FIG. 4 illustrates an example of a product data structure.

Once online merchandise monitor system has extracted online product information from online merchants, the system can parse the information into organized data for products. FIG. 4 illustrates an example of a product data structure. The product data structure 400 includes a product ID 410 (also referred to as PID). The product ID 410 is a unique identifier for a type of product. Multiple models of products can be identified by the same product ID 410 as the same product. The product data structure 400 further includes one or more link data structure 420. Each link data structure includes a link ID 422 (also referred to as LID). A link ID 422 is a unique identifier of a product being sold at a particular merchant. In other words, each link ID 422 typically corresponds to a product buy page hosted on a merchant website. Other items including coupons, circulars, articles, social network friends, pictures can also be assigned with link ID 422. In one embodiment, the system can includes millions of link IDs in a database of the system.

The link data structure further includes link specification data 424. The link specification data 424 are chunks of text and/or numbers that describe the product being sold at the corresponding product buy page. In other words, the link specification data 424 includes property information about the product. For instance, the link specification data 424 may include physical specifications such as the product's weight, or an abstract definition of the product. In some embodiment, the link specification data 424 may include information that is not created from unstructured data of the product buy page. For example, the link specification data 424 may include implied value like the product's data of birth or manufacture date, or color of the product recognized from the picture in the product buy page.

The product data structure 400 can further include composite specification data 430 which are based on the link specification data 424 of one or more different link IDs. The system is capable of determining the composite specification data 430 at a per user level. In other words, the description or definition of a product data structure 400 for one user can be different than the description or definition of the product for another user. When one link specification data 424 within a product data structure 400 changes, the system can change the composite specification data 430 accordingly.

When two different link IDs are included in a product data structure of the same product ID, the products corresponding to the link IDs are considered either identical or similar. The online merchandise monitor system provides a product dashboard to list the prices of products from different online merchants. If a specific product is unavailable from a particular online merchant, the system can instead list a price of a similar product.

Figure 5:
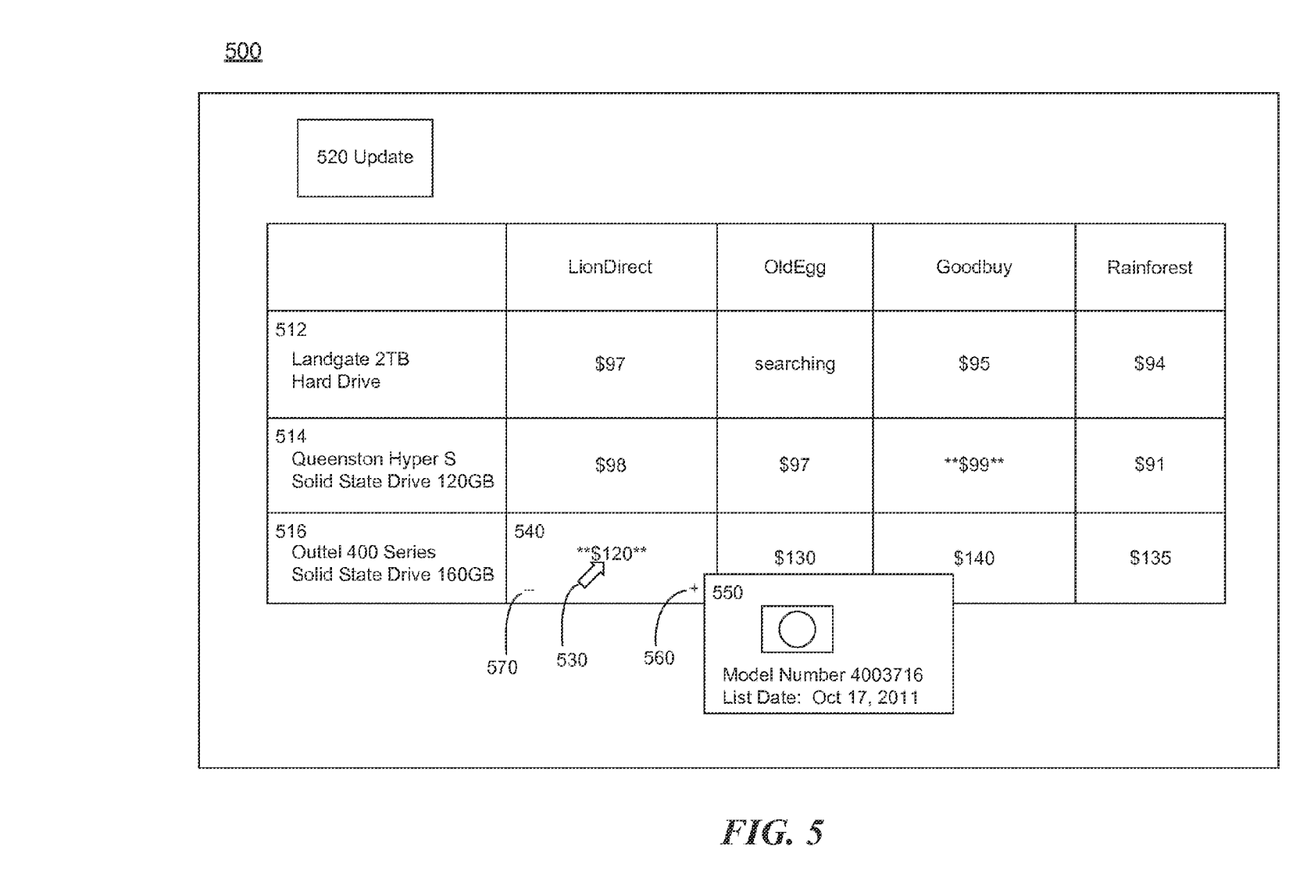
FIG. 5 illustrates an example of a product dashboard of an online merchandise monitor system.

FIG. 5 illustrates an example of a product dashboard of an online merchandise monitor system. The product dashboard 500 (also referred to as search grid, or grid) lists names of the online merchants being monitored on top of the dashboard 500. As shown in FIG. 5, online merchants LionDirect, OldEgg, Goodbuy and Rainforest are currently being monitored. The product names of the products being monitored are listed along the left side of the dashboard. The actual layout of the user interface of the product dashboard can be different in other embodiments, as readily appreciated by a person having ordinary skill in the art.

For each listed product, the dashboard 500 attempts to list prices of the product from each monitored merchant. There are cases that a merchant does not carry a monitored product. For instance as shown in FIG. 5, merchant OldEgg does not carry product 512 Landgate 2 TB hard drive. The online merchandise monitor system tries to search for products that merchant B carries similar to the product 512. Hence, the dashboard 500 shows the status "searching" in the dashboard block corresponding to the merchant B and the product 512.

In one embodiment, the online merchandise monitor system uses web service application programming interface (API) to identify similar products that are sold by merchant B. Then the system uses Asynchronous JavaScript and XML (AJAX) interface to display the recommended products in the appropriate blocks. For instance, the dashboard block corresponding to the merchant Goodbuy and the product 514 "Queenston HyperS solid state drive 120 GB" shows a price of $99 with a mark including asterisks. The mark indicates that merchant Goodbuy does not carry the product 514 and that the online merchandise monitor system has found a product similar to the product 514 "Queenston HyperS solid state drive 120 GB" that is being sold at merchant Goodbuy. The similar product is sold at a price $99 at merchant Goodbuy. In other words, this similar product priced at $99 is the best match for the product 514 from the merchant Goodbuy. In some embodiments, the boxes with matched similar products flash yellow to denote the user that the online merchandise monitor system has a recommendation of similar product.

The dashboard can include an update button 520. Once a user clicks the update button 520, the online merchandise monitor system initiates new enquires attempting to find the best matches for products that are not sold from the merchants.

A user can move the curser over a block (also referred to as a cell) having recommendation to see a popup window. As shown in FIG. 5, when a curse 530 is over a block 540, a popup window 550 displays near the block 540. The popup window 550 contains a list of detailed specifications of the recommended similar product, including a product picture, description, barcode and other information. In another embodiment, when a curse is hovering over a block, a window shows additional information about the item to allow a user to classify the item. In yet another embodiment, the user can interact with the blocks via other types of interactions.

The block 540 further includes a plus sign 560. If the user considers the recommended product is a good match to the monitored product, he can hit the plus sign 560. When the plus sign 560 is hit, the online merchandise monitor system treats the recommended product as being accepted. The criterions that are used to identify the recommended product will be positively reinforced in the database for the user. In one embodiment, a table containing weight preference updates its content in the background. Accordingly the monitor system changes the recommendations for other products on the dashboard 500 based on the updated weight preferences.

Similarly, the block 540 can further include a minus sign 570. If the user considers the recommended product is a bad match to the monitored product, he can hit the minus sign 570. The dashboard will remove the recommended product. The table containing weight preference will update its content accordingly.

The plus sign 560 and minus sign 570 can be used for purpose other than indicating a good or a bad match to the product. For example, the plus sign 560 and minus sign 570 can be used for increase or decrease the rating of the product. In another example, users can click the plus sign 560 and minus sign 570 to suggest whether a promotion represented by the block is noteworthy or not. In some other embodiments, the block can include additional control elements allowing the users to further interact with the block without the need to use the popup interactive elements.

The product dashboard 500 can be utilized to other type of pricing data and is not restricted to products being sold by resellers with the prices shown in the cells. For instance, the product dashboard 500 can show data such as rebates, shipping, and total cost of ownership in the cells of the product dashboard 500.

The information in the cells of the product dashboard 500 can be presented in other forms instead of text. For instance, the information in the cells can be presented with images, animated figures (e.g. animated GIF or animated PNG), movies, games, and any other rich content including sound and/or interactive content. The purpose of the cell is to grant the users easy access to a large quantity of data at a glance. For instance, multiple users can view the same grid (e.g. product dashboard 500) of data and update the contents in real time. The update made by any of these users will reflect on the instances of the grid being viewed by other users.

The contents of the cells can change automatically, without any user interaction or intervention. In other words, the grid can automatically update the contents of the cells when new data are received in real time. For instance, when product price changes in real time or time limited offers start or finish, the cells can automatically reflect the changes on the grid.

The column and the rows of the grid can be used to designate other factors instead of products and merchants. For instance, the columns of the grid can be used to designate certain collections of people, and the rows of the product dashboard 500 be used to designate people. Such a grid or dashboard can be used to identify similarities between the collections (i.e. groups) of people. In another example, the columns of the grid can be used to designate news publications, and the rows of the product dashboard 500 be used to designate head topics.

The size of each cell is not limited to one column or one cell. In other words, certain cells can span across multiple columns and/or multiple rows. In one example, a cell representing a bundled product can overlap two rows in the grid. In another example, a cell representing a cross site promotion between a reseller and the manufacturer can span across the columns for the reseller and the manufacturer. Cells can vary in size from any type of ranking system including whether or not certain listings are more favorable than others.

In one embodiment, a time element can also be added into a cell to allow a user specifying the slice of time for the grid. Using the time element, a user can back-track the historical information of the grid as if he was viewing it live. This would be done by multiple slices of grid data that can be layered on top of each other. This control can be done manually by the user or via an automatically flyby mode where the user can allow the system to advance the slices at any time rate.

Furthermore, these slices can be merged to display the data in 3D figure. One dimension of the 3D figure can be designated to time points of the slices. User can use the 3D figure to track alert violations or promotion periods, for instance.

The online merchandise monitor system attempts to populate each block in the dashboard. The system treats any product from a specific merchant that is not being displayed in the dashboard as a potential match candidate. Each time a user trains the system by accepting or rejecting a match in a block, the system adjusts the recommendations for all blocks of the entire column (i.e. of the specific merchant) that the block belongs to. The benefit is that a small amount of training can be sufficient to provide satisfying matches, even at an early stage of training.

In some embodiments, the online merchandise monitor system can identify matches via an API provided by an online merchant, based on keywords that exist in the weight table or Universal Product Code (UPC) tags. In some other embodiments, the candidate matches can be expressed as key-value pairs.

Figure 6:
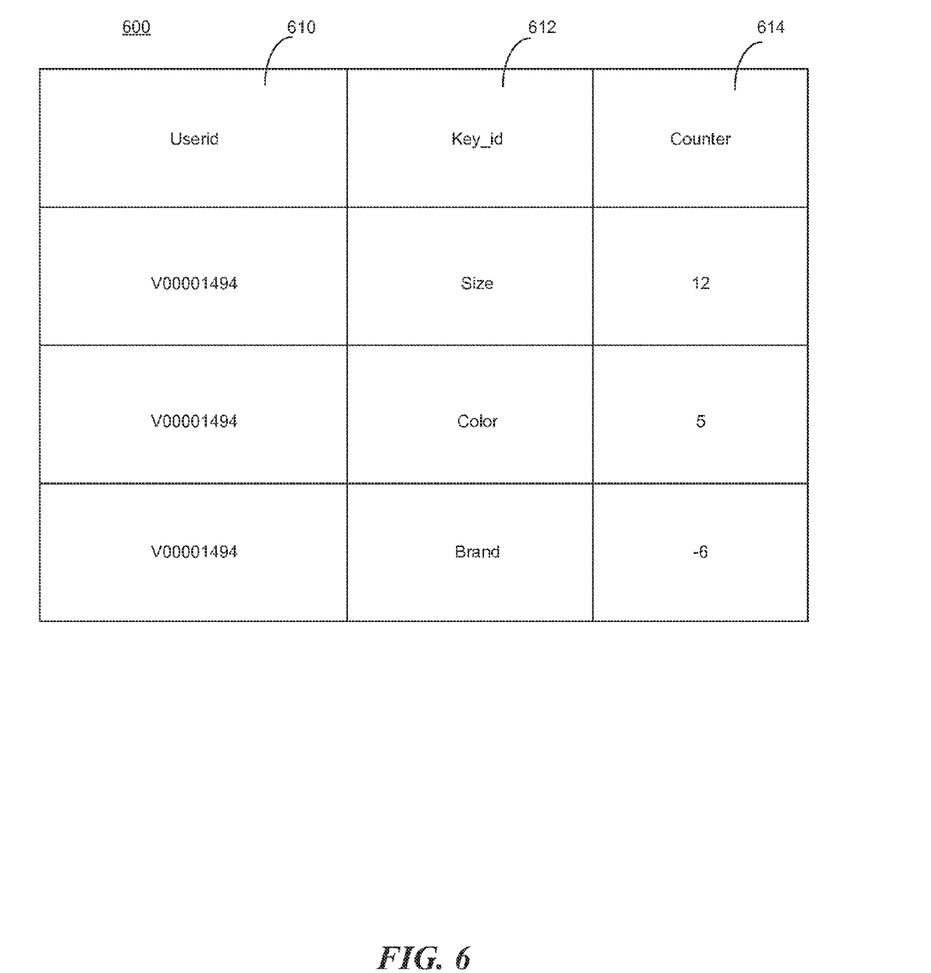
FIG. 6 illustrates an example of a weight table of a user.

In one embodiment, for each user, the online merchandise monitor system maintains a user account. Each user account includes a weight table for storing match training data for a corresponding user. When a user clicks a plus sign or a minus sign to accept or reject a recommendation of a similar product. The specification data of the similar product will be reinforced (also referred to as plus reinforcement) or weaken (also referred to as minus reinforcement) in the weight table of the user. For instance, a user may click a plus sign to accept a "2 TB Eastern Hard Drive" as appropriate match for the target product. The specification data of the "2 TB Eastern Hard Drive" include "size: 2 TB" and "color: black," denoted as "key: value" pairs. After the user hits the plus sign, the system increase a counter for each of the specification entries in a weight table of the user.

FIG. 6 illustrates an example of a weight table of a user. The weight table 600 includes a column of userid 610 for identifying the user. The weigh table 600 further includes a column of key_id 612 for identifying each specification entries. In some embodiments, the key_id column stores numerical IDs rather than text of the specification entries. The weigh table 600 further includes a column of counter 614 for to record the number of times a user has reinforced or weaken the weight relationship by hitting a plus or minus sign. As shown in the FIG. 6, the user has accepted 12 net times on products having specification related to "size" by hitting the plus sign. The user also has accepted 5 net times on precuts having specification related to "color." The user has accepted −6 net times on products having specification related to "brand." That means, for instance, the user may have hit the plus signs 3 times and the minus signs 9 times on products having specification related to "brand."

The system administrator of the online merchandise monitor system can manually adjust each weight counter or even lock the weight counters in the weight table. For instance, in one embodiment, the administrator can assign safeguard values, including minimum and maximum accepted values in the weight table, to avoid the system to be overly trained. The system can record the values of the weigh counter when the user initiates a plus or minus reinforcement. But if a weight counter value exceeds the maximum accepted value or is less than the minimum accepted value, the system uses the maximum or minimum accepted value as the weight counter value of the specification to conduct the product matching.

In one embodiment, the online merchandise monitor system uses specification keys for matching products. If two products have the same specification keys, but different specification values, they have a weaker relationship between each other than two products that have the same specification keys and the same specification values. Likewise, two products that do not have the same specification keys or values have an even weaker relationship.

The system stores a detailed list of specifications for each link ID. The system retrieves the information from product buy pages of the merchant website, and parses the specification information of products from the retrieved product buy pages. For instance, a product buy page may list information such as "Capacity: 128 GB." The system will parse the information and store the specification as a "key: value" pair for the product. Data with different data types can be parsed from the product buy pages. The system can define relationships between associated data types. For example, the system can define a conversion relationship between data type "GB" and data type "TB."

In another example, the system can define a relationship between data type "GB" and data type "GiB." One GiB (gibibyte) roughly equals to 1.074 GB (gibabyte). Since the system recognize the data types GB and GiB are associated data types for storage capacity (or other purposes) with a defined conversion relationship, the system can compare products having capacity denoted as GB with products having capacity denoted as GiB.

In one embodiment, the system stores the associated data types as a linked list. For example, the system can pick one data type among a group of associated data types as the prime data type. Other data types in the group can be converted to the prime data type before comparing the specification data among products. In some other embodiment, the system can store the associated data types as other types of data structures, as readily appreciated by a person having ordinary skill in the art.

The system continues to parse the information collected from the product buy pages. The system uses an evaluation statement to recognize data type from the parsed information. Once the data type is recognized and is not a prime data type, the system uses a datatype statement to convert the recognized data type into a prime data type.

In one embodiment, the online merchandise monitor system can assign specification values to the "key: value" pairs from information that is not in the text of the product buy pages. For instance, the system can recognize the color of the product from a product image shown on the product buy page, and assign the color value, as a text or numerical value, to the specification information for the product color.

Figure 7:
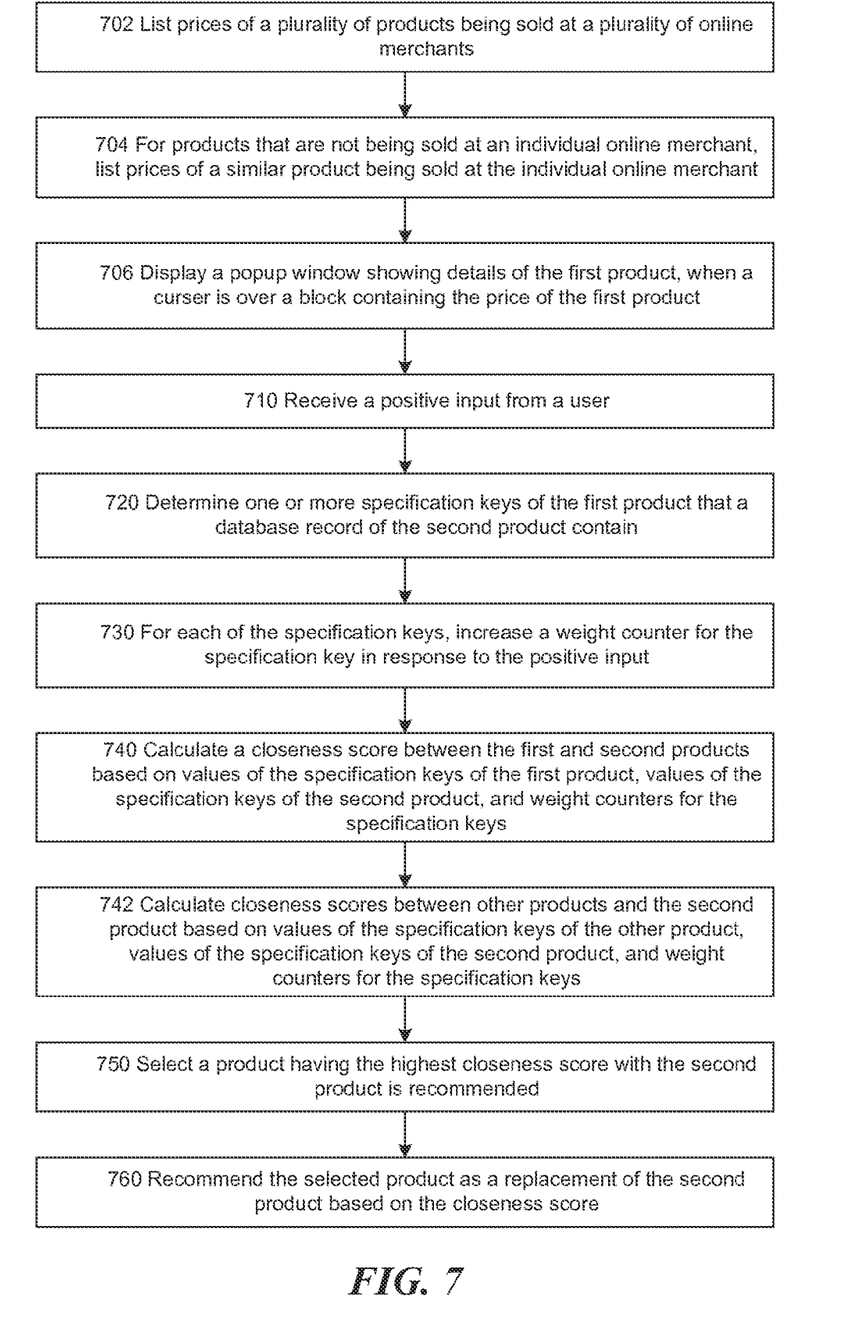
FIG. 7 illustrates an example process of monitoring and recommending similar products.

FIG. 7 illustrates an example process of monitoring and recommending similar products. At step 702, the system lists prices of a plurality of products being sold at a plurality of online merchants. At step 704, for products that are not being sold at an individual online merchant, the system lists prices of a similar product being sold at the individual online merchant. At step 706, the system displays a popup window showing details of the first product, when a curser is over a block containing the price of the first product.

At step 710, the system receives a positive input from a user. The positive input indicates that the user accepts that a first product is similar to a second product.

At step 720, the system's database determines one or more specification keys of the first product that a database record of the second product contain.

At step 730, for each of the specification keys, the system increases a weight counter for the specification key in response to the positive input.

At step 740, the system calculates a closeness score between the first and second products based on values of the specification keys of the first product, values of the specification keys of the second product, and weight counters for the specification keys. A numerical value of the closeness score indicates how similar the first product is to the second product. In one embodiment, the closeness score is a sum of differences of the values of the specification keys of the first and second products, the differences being weighted by the weight counters for the specification keys. If a value of one of the specification keys of the first or second product is not available, the closeness score is calculated assuming the value is 1.

At step 742, the system calculates closeness scores between other products and the second product based on values of the specification keys of the other product, values of the specification keys of the second product, and weight counters for the specification keys.

At step 750, the system selects a product having the highest closeness score with the second product is recommended. At step 760, the system recommends the selected product as a replacement of the second product based on the closeness score.

Figure 8:
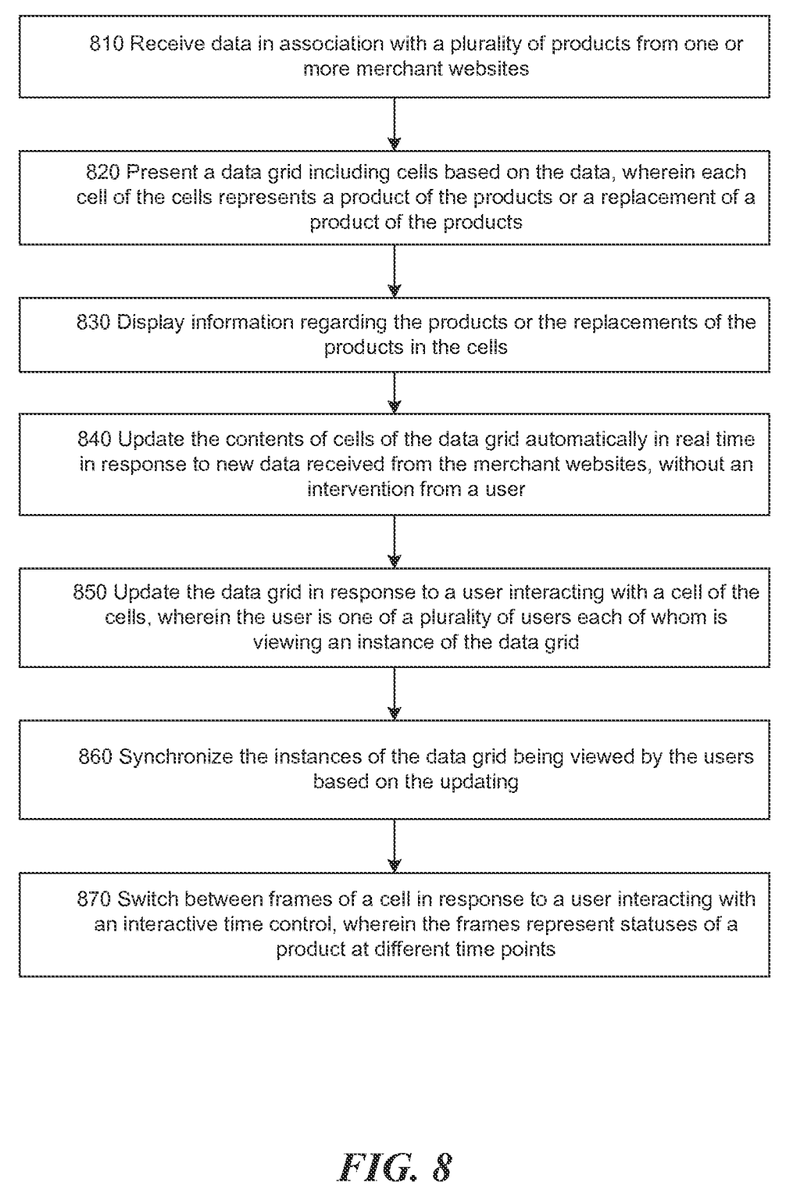
FIG. 8 illustrates an example process of presenting a product data grid.

FIG. 8 illustrates an example process of presenting a product data grid. At step 810, a computer system receives data in association with a plurality of products from one or more merchant websites.

At step 820, the computer system presents a data grid including cells based on the data, wherein each cell of the cells represents a product of the products or a replacement of a product of the products. In some embodiments, at least one cell of the cells span across multiple columns or multiple rows. A cell spanning across multiple rows can represent a bundled product. A cell spanning across multiple columns can represent a product that is being sold by a merchant designated by a first column of the columns, and is manufactured by manufacture designated by a second column of the columns. The cells can contain text, images, animated figures, movies, games, audio clips, or interactive contents.

At step 830, the computer system displays information regarding the products or the replacements of the products in the cells. In some embodiments, the information regarding the products or the replacements of the products in the cells can include product prices, rebate information, shipping information, or cost of ownership information.

At step 840, the computer system updates the contents of cells of the data grid automatically in real time in response to new data received from the merchant websites, without an intervention from a user. In one embodiment, the new data include information of a price change for a product, an update of a time limited offer, a change of shipping information, or a change of a rebate for a product.

At step 850, the computer system updates the data grid in response to a user interacting with a cell of the cells, wherein the user is one of a plurality of users each of whom is viewing an instance of the data grid. At step 860, the computer system synchronizes the instances of the data grid being viewed by the users based on the updating.

At step 870, the computer system switching between frames of a cell in response to a user interacting with an interactive time control, wherein the frames represent statuses of a product at different time points. In some other embodiments, the computer system displays sequentially the frames of the cell in response to a user interacting with an interactive time control. In one embodiment, the interactive time control can include buttons to switch forward or backward between the frames. In another embodiment, the interactive time control can include buttons to start the sequential playing of the frames or stop it.

Figure 9:
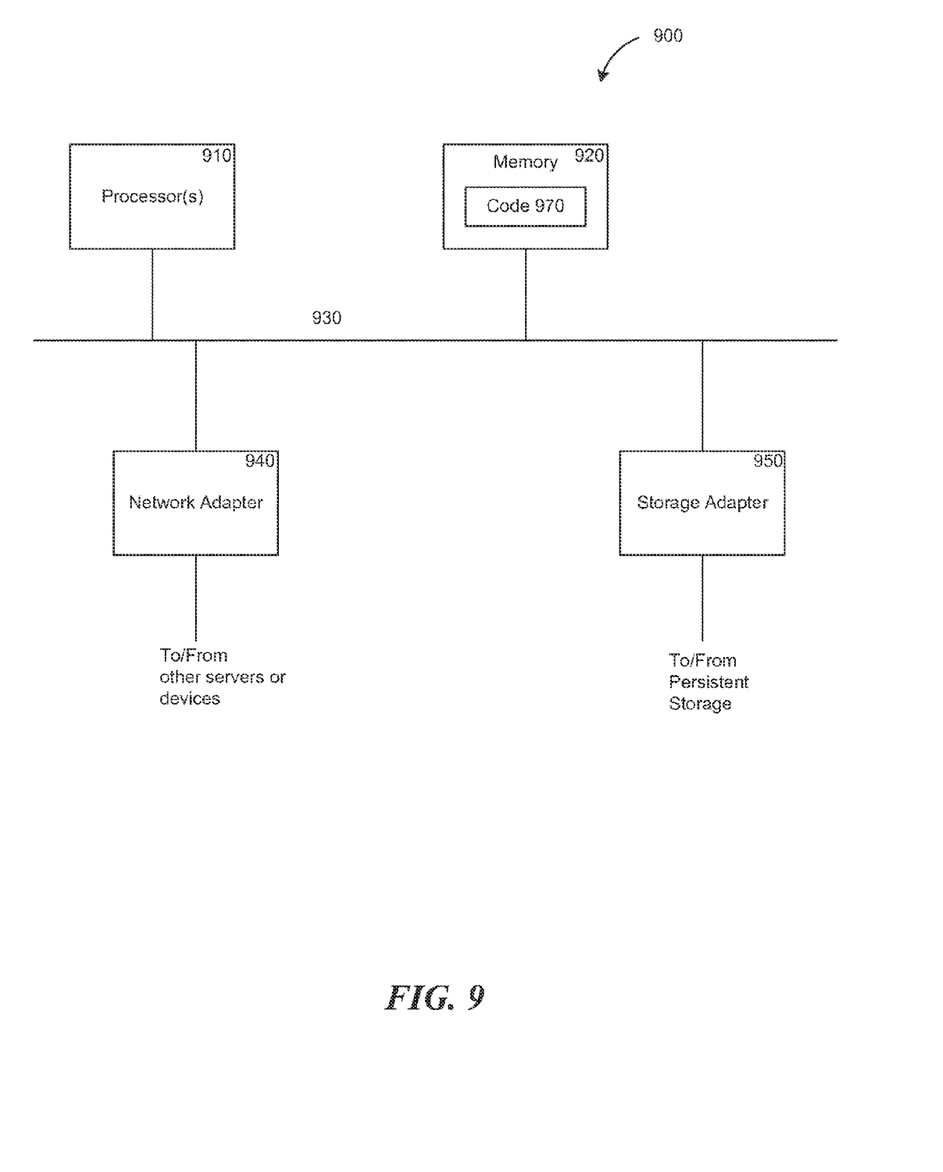
FIG. 9 is a high-level block diagram showing an example of the architecture of a computer server, which may represent any server of an online merchandise monitor system described herein.

FIG. 9 is a high-level block diagram showing an example of the architecture of a computer server 900, which may represent any server of an online merchandise monitor system described herein. The server 900 includes one or more processors 910 and memory 920 coupled to an interconnect 930. The interconnect 930 shown in FIG. 9 is an abstraction that represents any one or more separate physical buses, point to point connections, or both connected by appropriate bridges, adapters, or controllers. The interconnect 930, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 910 is/are the central processing unit (CPU) of the server 900 and, thus, control the overall operation of the server 900. In certain embodiments, the processor(s) 910 accomplish this by executing software or firmware stored in memory 920. The processor(s) 910 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 920 is or includes the main memory of the server 900. The memory 920 represents any form of random access memory (RAM), read-only memory (ROM), flash memory, or the like, or a combination of such devices. In use, the memory 920 may contain, among other things, code 970 embodying at least a portion of an operating system of the server 900. Code 970 may also include instructions for executing the techniques disclosed herein.

Also connected to the processor(s) 910 through the interconnect 930 are a network adapter 940 and a storage adapter 950. The network adapter 940 provides the server 900 with the ability to communicate with devices, such as online merchant web servers and client devices, over a network and may be, for example, an Ethernet adapter or Fibre Channel adapter. The storage adapter 950 allows the server 900 to access a persistent storage, and may be, for example, a Fibre Channel adapter or SCSI adapter.

The code 970 stored in memory 920 may be implemented as software and/or firmware to program the processor(s) 910 to carry out actions described below. In certain embodiments, such software or firmware may be initially provided to the server 900 by downloading it from a system through the server 900 (e.g., via network adapter 940).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-record-

What is claimed is:

1. A computer-implemented method for generating a data grid interface, comprising:
   receiving, via a network interface of a data mining system, data in association with a plurality of products from one or more merchant websites;
   generating and presenting, by the data mining system, a data grid interface including cells based on the data, wherein each cell of the cells represents a product of the plurality of products or a replacement of the product of the plurality of products;
   identifying and displaying, by the data mining system, information regarding products or replacements of the products in the cells; and
   updating, by the data mining system, the contents of cells of the data grid interface automatically in real time in response to new data received from the merchant websites;
   responsive to updating the contents of cells and detecting historical information of the grid, adding, by the data mining system, a time element into a cell, the time element configured to allow selection of a slice of time for the grid and the time element configured to, responsive to a selected slice of time, track the historical information of the grid by being configured to layer multiple slices of grid data on top of each other;
   wherein a cell of the cells contains multiple frames and represents a product, each frame of the frames represents a status of the product at a different time point; and
   wherein the cell contains an interactive time control, the interactive time control configured to cause a switch between the frames of the cell in response to a user request.

2. The computer-implemented method of claim 1, further comprising:
   updating the data grid interface in response to a user interacting with a cell of the cells, wherein the user is one of a plurality of users each of whom is viewing an instance of the data grid interface; and
   synchronizing the instances of the data grid interface being viewed by the users based on the updating.

3. The computer-implemented method of claim 1, wherein said updating comprises:
   updating the contents of cells of the data grid interface automatically in real time in response to new data received from the merchant websites, without an intervention from a user.

4. The computer-implemented method of claim 1, wherein the new data include information of a price change for a product, an update of a time limited offer, a change of shipping information, or a change of a rebate for a product.

5. The computer-implemented method of claim 1, wherein at least one cell of the cells spans across multiple columns or multiple rows.

6. The computer-implemented method of claim 1, wherein at least one cell of the cells spanning across multiple rows represents a bundled product.

7. The computer-implemented method of claim 1, wherein at least one cell of the cells spanning across multiple columns represents a product that is being sold by a merchant designated by a first column of the columns, and is manufactured by manufacture designated by a second column of the columns.

8. The computer-implemented method of claim 1, wherein the interactive time control is configured to cause the frames of the cell to display sequentially in response to the user request.

9. The computer-implemented method of claim 1, wherein at least one cell of the cells contains an interactive control that can be used to indicate a replacement represented by the cell is a good or bad match to a product.

10. The computer-implemented method of claim 1, wherein at least one cell of the cells contains an interactive control that can be used to set a rating for a product or a replacement of a product that is represented by the cell.

11. The computer-implemented method of claim 1, wherein at least one cell of the cells contains an interactive control that can be used to suggest a promotion of a product that is presented by the cell is noteworthy.

12. The computer-implemented method of claim 1, wherein the information regarding the products or the replacements of the products in the cells includes product prices, rebate information, shipping information, or cost of ownership information.

13. The computer-implemented method of claim 1, wherein the cells contain text, images, animated figures, movies, games, audio clips, or interactive contents.

14. A computer system for generating a data grid interface, comprising:
   a processor;
   a network interface, coupled to the processor, through which the computer system can retrieve data in association with a plurality of products from one or more merchant websites; and
   a memory storing instructions which, when executed by the processor, cause the computer system to perform a process including:
      generating and presenting a data grid interface including cells based on the data, wherein each cell of the cells represents a product of the plurality of products or a replacement of the product of the plurality of products;
      identifying and displaying information regarding products or replacements of the products in the cells; and
      updating the contents of cells of the data grid interface automatically in real time in response to new data received from the merchant websites;
      responsive to updating the contents of cells and detecting historical information of the grid, adding, a time element into a cell, the time element configured to allow selection of a slice of time for the grid and the time element configured to, responsive to a selected slice of time, track the historical information of the grid by being configured to layer multiple slices of grid data on top of each other;
      wherein a cell of the cells contains multiple frames and represents a product, each frame of the frames represents a status of the product at a different time point; and wherein the cell contains an interactive time control, the interactive time control configured to cause the frames of the cell to display sequentially in response to a user request.

15. The computer system of claim 14, wherein the network interface is configured to transmit instructions to a client device for presenting an instance of the data grid interface on the client device.

16. The computer system of claim 14, wherein the network interface is configured to receive a signal indicating that a user interacts with a cell of the cells of the data grid interface, and wherein the process further includes:
   updating the data grid interface in response to the signal; and
   transmitting instructions to a plurality of client devices for updating instances of the data grid interface on the client devices.

17. The computer system of claim 14, wherein a cell of the cells spans across multiple columns or multiple rows.

18. The computer system of claim 14, wherein the information regarding the products or the replacements of the products in the cells includes product prices, rebate information, shipping information, or cost of ownership information; and wherein the cells present the information in forms of text, images, animated figures, movies, games, audio clips, or interactive contents.

19. A processing system for generating a data grid interface, the processing system comprising:
   means for receiving data in association with a plurality of products from one or more merchant websites;
   means for generating and presenting the data grid interface including cells based on the data, wherein each cell of the cells represents a product of the plurality of products or a replacement of the product of the plurality of products;
   means for identifying and displaying information regarding products or replacements of the products in the cells; and
   means for updating the contents of cells of the data grid interface automatically in real time in response to new data received from the merchant websites;
   means for adding, responsive to updating the contents of cells and detecting historical information of the grid, a time element into a cell, the time element configured to allow selection of a slice of time for the grid and the time element configured to, responsive to a selected slice of time, track the historical information of the grid by being configured to layer multiple slices of grid data on too of each other;
   wherein a cell of the cells contains multiple frames and represents a product, each frame of the frames represents a status of the product at a different time point; and
   wherein the cell contains an interactive time control, the interactive time control configured to cause a switch between the frames of the cell in response to a user request.

20. The processing system of claim 19, further comprising:
   means for expanding a cell of the cells to span across multiple columns or multiple rows of the data grid interface, wherein the cell represents a bundled product or a product being sold or manufactured by different parties respectively.

\* \* \* \* \*